United States Patent
Bonicel et al.

[11] Patent Number: 6,035,087
[45] Date of Patent: Mar. 7, 2000

[54] OPTICAL UNIT FOR FIBER OPTIC CABLES

[75] Inventors: Jean-Pierre Bonicel, Rueil Malmaison, France; Peter Elisson; Olivier Tatat, both of Hickory, N.C.; Magnus Gunnarsson, Grimsas, Sweden

[73] Assignee: Alcatel, Paris, France

[21] Appl. No.: 09/037,057

[22] Filed: Mar. 9, 1998

[30] Foreign Application Priority Data

Mar. 10, 1997 [FR] France .................................. 97 02790
Jul. 17, 1997 [FR] France .................................. 97 09073

[51] Int. Cl.$^7$ ...................................................... G02B 6/44
[52] U.S. Cl. .......................... 385/109; 385/110; 385/112; 385/113; 385/114
[58] Field of Search ..................... 385/109, 110, 385/111, 112, 113, 114

[56] References Cited

U.S. PATENT DOCUMENTS

| | | | |
|---|---|---|---|
| 4,515,435 | 5/1985 | Anderson | 385/109 X |
| 4,568,144 | 2/1986 | Ochini et al. | 385/109 X |
| 4,744,631 | 5/1988 | Eichenbaum et al. | 385/114 X |
| 5,229,851 | 7/1993 | Rahman | 385/114 |
| 5,457,762 | 10/1995 | Lochkovic et al. | 385/114 |
| 5,751,880 | 5/1998 | Gaillard | 385/109 |

FOREIGN PATENT DOCUMENTS

| | | | |
|---|---|---|---|
| 0321788A2 | 6/1989 | European Pat. Off. | 385/109 X |
| 0 769 711 A1 | 4/1997 | European Pat. Off. | 385/109 X |
| 2280911 | 2/1996 | France | 385/109 X |
| 2747201 | 10/1997 | France | 385/109 X |
| 29502851 U | 5/1995 | Germany | 385/109 X |

*Primary Examiner*—Brian Healy
*Attorney, Agent, or Firm*—Sughrue, Mion, Zinn, Macpeak & Seas, PLLC

[57] ABSTRACT

An optical unit (5a, 5b) comprising a plurality of optical fibers (2) grouped together in a tube (3a, 3b) and optionally assembled into one or more ribbons inside tube. The tube (3a, 3b) has a Young's modulus less than 200 MPa and a Shore A hardness less than 90 at a temperature of approximately +20° C. and a Young's modulus less than 2000 MPa at a temperature of approximately −40° C. A fiber optic cable (10, 20) comprising at least one such optical unit (5a, 5b). Application of the cable to telecommunications.

9 Claims, 3 Drawing Sheets

OPTICAL UNIT FOR FIBER OPTIC CABLES

BACKGROUND OF THE INVENTION

The invention concerns an optical unit for fiber optic cables, generally used in telecommunications, said unit comprising a plurality of optical fibers grouped in a tube and possibly assembled into one or more ribbons inside the tube. It is more particularly concerned with the material of the tube of a unit of this kind containing the optical fibers.

A cable comprising a unit of the above kind is used in telecommunications and in particular in distribution systems with high levels of branching where a plurality of such cables are assembled to form a macro-cable at the head end with a high density of optical fibers.

FIGS. 1 and 2 show in cross-section two prior art cables with a Unitube® structure (FIG. 1) and a stranded loose tube structure (FIG. 2), respectively. A prior art stranded loose tube structure cable is described in document FR-A-2 280 911, for example.

The optical fiber cables 10 and 20 comprise optical fibers 2 in the form of bundles or ribbons loosely received in a tube 3 the longitudinal axis of which is that of the cable (Unitube® structure) or in a plurality of tubes 3 wound around a central strength member 1 made of a dielectric material (stranded loose tube structure). An optical unit 5 comprises a tube 3 and the optical fiber(s) 2 it contains.

Around the unit 5 of the Unitube® structure cable 10 or the set of units 5 of the stranded loose tube structure cable 20 are disposed in succession a mechanical reinforcing layer 6 consisting of dielectric reinforcing members, for example, and a protective outer sheath 7 made from an insulative material. The empty spaces between units 5 of the cable 20 can be filled with a filler material, for example a filler gel 4, providing a longitudinal seal, or contain elements that swell in the presence of a liquid to provide the seal.

The tube(s) 3 of the units 5 containing the optical fibers 2 are conventionally made of a hard rigid material, such as high-density polyethylene (HDPE) or polybutylene terephtalate (PBT); they can equally comprise a double polybutylene terephtalate/polycarbonate (PBT/PC) layer. According to document FR-2 280 911 the tubes of the stranded loose tube structure can also be of polyethylene or polypropylene.

The Young's modulus of the material of the tubes 3 in the prior art cables 10 or 20 is generally high, in the order of 2 400 MPa to 2 600 MPa at 20° C. Tubes of this type provide good mechanical protection for the optical fibers 2, especially against radial compression loads. Tubes made from a material with a lower Young's modulus must be relatively thick to provide good resistance to radial compression of the cable. In this case the thickness of the tubes 3 is relatively great (typically in the order of 0.5 mm for stranded loose tube structures and 0.75 mm for Unitube® structures). Accordingly the cables 10 or 20 obtained are very bulky and/or very stiff, and consequently difficult to handle.

For this reason European patent application EP-A-0.769.711 proposes to use flexible and elastic materials for the tube of the fiber optic unit(s); in particular it proposes an optical unit for a fiber optic telecommunication cable comprising a tube made from a plastics material in which at least one optical fiber is loosely received, characterized in that the thickness of said tube is less than or equal to 0.5 mm and in that said material has a Young's modulus less than 1 500 MPa at 20° C. and a stress/strain curve with no yield point. A material of the above kind makes cables that are less bulky and easier to handle than the prior art cables previously referred to.

Confinement of the optical fibers in the tube also raises the problem of increased attenuation caused by microcurvature. The tube must be able to deform under external mechanical or thermal load in a way that does not generate microcurvature of the optical fibers tightly received inside the tube.

Connecting a cable including an optical unit of this kind also raises the problem of cutting the tube. Cutting must be easy and must not entail any risk of damaging the optical fibers tightly received inside the tube.

SUMMARY OF THE INVENTION

The aim of the invention is to provide an optical unit for fiber optic cables comprising a plurality of optical fibers optionally assembled into one or more ribbons grouped together in a tube consisting mainly of a single material. A cable of the above kind is easier to manufacture at lower cost and the tube has improved optical performance, mechanical strength and ease of access to the optical fibers.

To this end, the invention consists in an optical unit for a fiber optic cable, said unit comprising a plurality of optical fibers grouped in a tube, characterized in that the tube has a Young's modulus less than 200 MPa and a Shore A hardness less than 90 at a temperature of approximately +20° C. and a Young's modulus less than 2 000 MPa at a temperature of approximately −40° C.

The fibers are grouped in the tube, which is advantageous in particular in terms of the reduced volume of the optical unit relative to the prior art situation in which they are loosely received in the tube. The tube is therefore very close to the optical fibers which can be assembled into one or more ribbons inside the tube. Accordingly the tube can be in contact with the optical fibers or the optical fiber ribbon(s) that it groups together, preferably with virtually no adhesion. However, the tube can also be at a distance from the optical fibers or the optical fiber ribbon(s) up to 0.1 mm.

The optical unit of the invention can also comprise a filler material such as a filler gel including grease, generally based on oils, usually based on silicones or polyalphaolefins.

Experiments have shown that the optical performance of the optical unit of the invention correlates with the flexibility of the material from which the tube is made.

A first test of optical performance entailed measuring the increased attenuation of a fiber in the unit relative to its attenuation in the free state.

A second performance test entailed measuring the variation of the attenuation of an optical fiber in the unit as a function of variation in temperature. The temperature excursion was between −40° C. and +70° C. to simulate real-life temperature differences to which telecommunication cables including such units are exposed in distribution networks.

Various materials were tested, mainly polymer materials, including thermoplastics polymers such as polyvinylchloride (PVC) and elastomers.

A correlation was then established between the attenuation of the unit tested with the tube made from one of these materials and the Young's modulus of the material, measured separately. Using an attenuation criterion, it was possible to define two upper thresholds of the Young modulus as a function of temperature: 200 MPa at a temperature of approximately +20° C. and 2 200 MPa at a temperature of approximately −40° C.

Accordingly, the optical unit of the invention comprises a tube having a flexibility capable of reducing the attenuation caused by microcurvature of the optical fibers grouped together in the tube by deforming under load.

Other tests showed that the ease of opening up the tube of the optical unit of the invention correlated with the hardness of the material of the tube.

Tests were carried out on the same materials as the previous tests and in which the tube was cut with a cutting tool. A correlation was established between the ease of opening up the tube of the optical unit and the hardness of the material of the tube, measured separately. Based on an ease of opening criterion, it was possible to define an upper threshold for the hardness of the material of the tube: Shore A hardness 90 at a temperature of approximately +20° C.

Accordingly, a tube made from a material having a Young's modulus and a hardness below the upper thresholds established experimentally by means of the aforementioned tests improves the optical performance and ease of access to the optical fibers of a cable of the invention.

The optical unit of the invention generally has a variation of attenuation equal to ±0.1 dB/km at a wavelength of 1 550 nm.

BRIEF DESCRIPTION OF THE DRAWINGS

Other features and advantages of the present invention will become more clearly apparent upon reading the following description given with reference to the corresponding appended drawings, in which.

DETAILED DESCRIPTION OF THE INVENTION

In all the figures common items carry the same reference numbers. The optical units of FIGS. 3 and 4 are designed to be inserted into fiber optic cables like those of FIGS. 1 and 2 in place of the optical units 3 described with reference to FIGS. 1 and 2.

Figure 1:
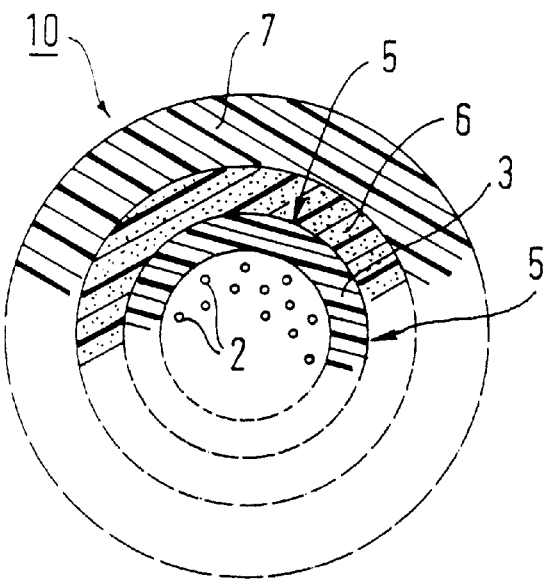
FIG. 1 is a diagram partly in section showing a prior art Unitube® structure cable.
Figure 2:
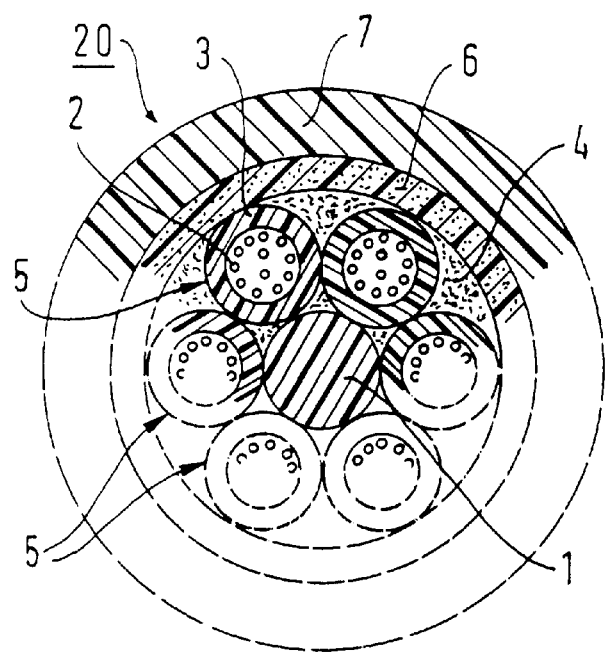
FIG. 2 is a diagram partly in section showing a prior art stranded loose tube structure cable.

FIGS. 1 and 2 have been described in connection with the prior art.

Figure 3:
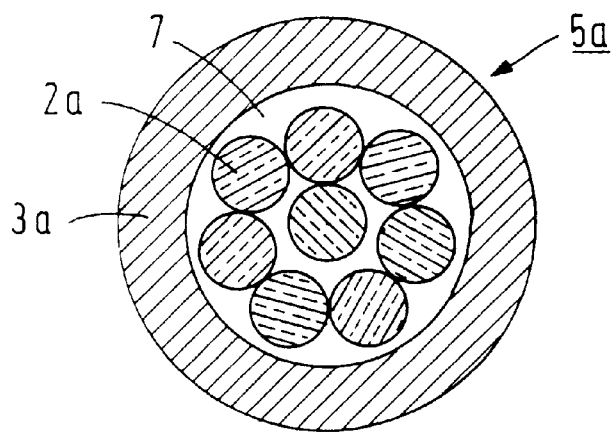
FIG. 3 is a diagram showing a first embodiment of an optical unit in accordance with the invention in cross-section.
Figure 4:
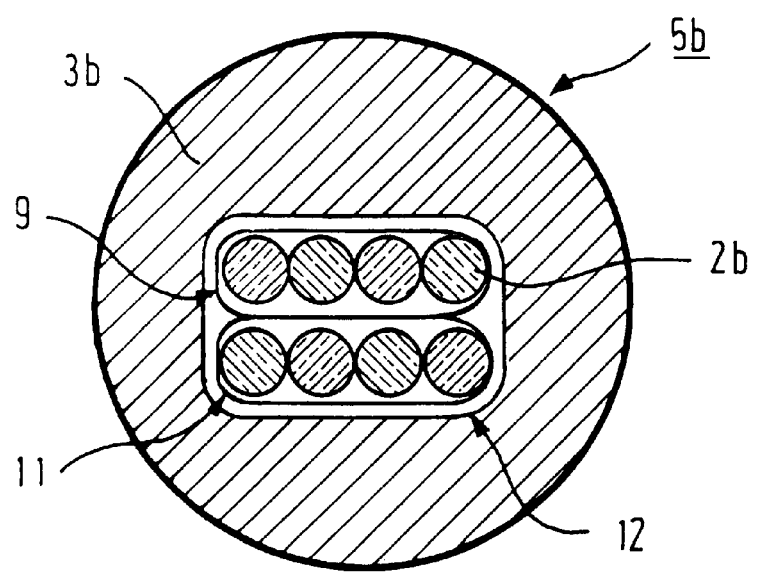
FIG. 4 is a diagram showing a second embodiment of an optical unit in accordance with the invention in cross-section, and FIG. 5 compares the effect of temperature on the attenuation of fibers housed in two optical units, one of which conforms to the first embodiment of the invention.

Referring to FIG. 3, the optical unit comprises a plurality of optical fibers grouped together in a tube 3a. An optical unit 5a is shown with eight optical fibers 2a grouped in a microtube type tube 3a fitting very close to the optical fibers. A filler material 7 such as a filler gel well known to the skilled person is present around the optical fibers 2a inside the tube 3a.

The optical unit 5a has the following specifications, for example:

cable diameter: 1.2 (mm)

tube thickness: 0.2 (mm)

optical fiber diameter: 0.250 (mm)

number of optical fibers: 8

The optical unit 1a constituting the first embodiment of the invention is used for Unitube® or stranded loose tube structure telecommunication cables, in particular in distribution networks with a high degree of branching, where an assembly of several such cables forms a macro-cable with a high density of optical fibers.

In a second embodiment of the invention (FIG. 4) the optical fibers 2b are assembled into two ribbons 9 and 11 each comprising four optical fibers. The optical unit 5b comprises a tube 3b which has in the cross-section plane of FIG. 4 a rectangular interior housing 12. The two ribbons 9 and 11 are received tightly inside the rectangular housing 12.

Assembly into ribbons enables easy identification of the optical fibers, which is particularly advantageous when connecting the cable comprising said optical unit. Note that a single ribbon or a plurality of ribbons is feasible and that each ribbon can include 6, 8 or 12 optical fibers. It is also possible in the context of the present invention to combine the first and second embodiments, i.e. to combine in the same optical unit individual optical fibers and at least one optical fiber ribbon.

The optical unit 5b had the following specifications, for example:

cable diameter: 2.0 (mm)

length and width of housing: 1.2×0.7 (mm)

optical fiber diameter: 0.250 (mm)

number of optical fibers: 8

The cable comprising the optical unit of the invention is manufactured by extrusion, for example. The following converge simultaneously towards the head of an extruding machine: the material of the tube, an optional cable filler material and the optical fibers or the optical fiber ribbons. The filler material is a gel, for example, for filling the interstices between the optical unit(s) and the cable tube, to protect the cable from moisture or to facilitate sliding of the optical unit.

The cable comprising the optical unit of the invention can also include any element such as an external protection layer (armoring, jacket, . . . ) or a reinforcing member: fiber reinforced plastic (FRP) or continuous reinforcing fibers such as glass fibers or aramide fibers covered with a thermoplastics or cross-linked organic matrix, all of which are well known to the skilled person.

The tube of the optical unit of the invention is made of a polymer, for example a thermoplastics material such as plasticized polyvinylchloride. An elastomer may also be suitable. The material of the tube has a Young's modulus less than 200 MPa and a Shore A hardness less than 90 at a temperature of approximately +20° C. It has a Young's modulus less than 2 000 MPa at a temperature of approximately −40° C.

Figure 5:
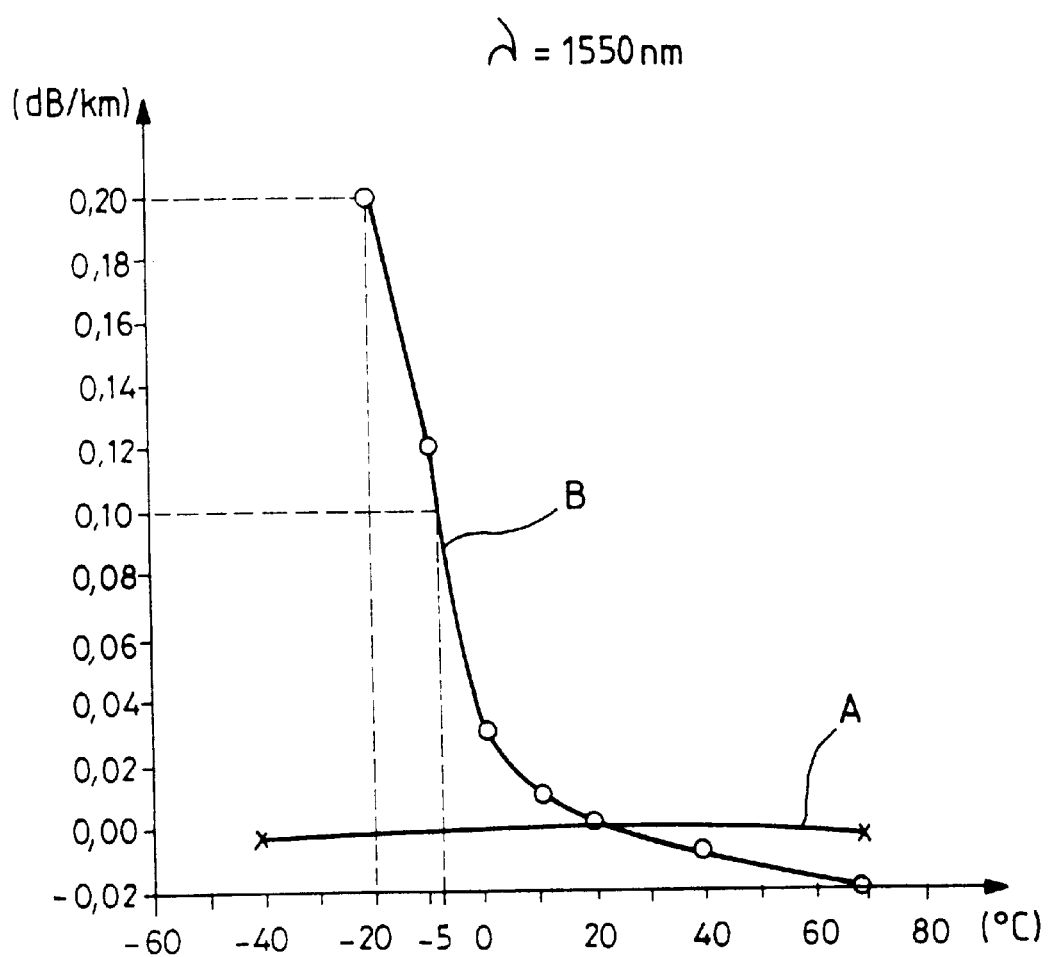

FIG. 5 shows the variation in the attenuation at a wavelength of 1 550 nanometers as a function of the temperature of an optical fiber housed in an optical unit. The reference attenuation of the optical fiber is taken at a temperature of +20° C.

The optical unit A comprises a tube in accordance with the invention made of plasticized polyvinylchloride having the following specifications:

Shore A hardness 78 at 20° C.,

Young's modulus 20 MPa at 20° C., and

Young's modulus 1 900 MPa at −40° C.

The tube of the optical unit B, which is made of a copolymer of polypropylene and ethylene, had a Young's modulus of approximately 1 200 MPa and a Shore A hardness greater than 98 (this hardness was off the Shore A scale) at a temperature of approximately +20° C., and a Young's modulus of approximately 3 000 MPa at a temperature of approximately −40° C.

The attenuation variation of the optical unit A complies with a criterion set at ±0.10 dB/km over the entire temperature excursion range from −40° C. to +70° C. On the other hand, the optical unit B complies with a criterion fixed at ±0.10 dB/km only for temperatures in the range −5° C. to +70° C.

We claim:

1. An optical unit (5a, 5b) for a fiber optic cable (10, 20), said unit comprising a plurality of optical fibers (2) grouped in a tube (3a, 3b), characterized in that the tube has a Young's modulus less than 200 MPa and a Shore A hardness less than 90 at a temperature of approximately +20° C. and a Young's modulus less than 2000 MPa at a temperature of approximately −40° C.

2. An optical unit according to claim 1 wherein the optical fibers are assembled in one or more ribbons (9, 11) inside the tube (3b).

3. An optical unit according to claim 1 wherein the tube is made from a thermoplastics material.

4. An optical unit according to claim 3 wherein the tube is made from plasticized polyvinylchloride.

5. An optical unit according to claim 1 wherein the tube is made from an elastomer.

6. An optical unit according to claim 1 wherein the optical fibers are at a distance from the tube in the range 0 to 0.1 mm.

7. A Unitube® type structure cable comprising an optical unit according to any claim 1.

8. A stranded loose tube type structure cable comprising an optical unit according to claim 6.

9. A telecommunication cable according to claim 7.

* * * * *